(12) United States Patent
Anvekar et al.

(10) Patent No.: US 6,684,072 B1
(45) Date of Patent: Jan. 27, 2004

(54) GLOBAL WIRELESS PREPAID ROAMING

(75) Inventors: Dinesh Kashinath Anvekar, Piscataway, NJ (US); Bhaskarpillai Gopinath, Watchung, NJ (US); David Glenn Summerfelt, Lutz, FL (US); Sridhar Sundaram, Highland Park, NJ (US)

(73) Assignee: Level Z, L.L.C., Piscataway, NJ (US)

( * ) Notice: Subject to any disclaimer, the term of this patent is extended or adjusted under 35 U.S.C. 154(b) by 437 days.

(21) Appl. No.: 09/645,710

(22) Filed: Aug. 24, 2000

(51) Int. Cl.[7] .................................................. H04Q 7/29
(52) U.S. Cl. ................. 455/432.1; 455/417; 455/432.1; 455/558; 455/406; 379/114.2; 379/114.05; 379/114.06
(58) Field of Search ................................ 455/417, 432, 455/433, 406, 435, 438, 408, 922, 558; 379/114.2, 114.05, 114.06, 436, 438, 439

(56) References Cited

U.S. PATENT DOCUMENTS

| | | | |
|---|---|---|---|
| 4,901,340 A | 2/1990 | Parker et al. ................. 379/60 |
| 5,577,100 A | 11/1996 | McGregor et al. ............ 379/58 |
| 5,812,945 A | 9/1998 | Hansen et al. ............. 455/403 |
| 5,815,561 A | 9/1998 | Nguyen et al. ............. 379/115 |
| 5,818,915 A | 10/1998 | Hayes, Jr. et al. .......... 379/114 |
| 5,826,185 A | 10/1998 | Wise et al. ................. 455/405 |
| 5,839,076 A | * 11/1998 | Becher ....................... 455/461 |
| 5,867,788 A | * 2/1999 | Joensuu ...................... 455/445 |
| 5,915,226 A | 6/1999 | Martineau ................... 455/558 |
| 5,946,380 A | 8/1999 | Cohen et al. ............... 379/127 |
| 5,978,678 A | * 11/1999 | Houde et al. ............... 455/433 |
| 5,983,091 A | 11/1999 | Rodriguez ................... 455/405 |
| 5,995,822 A | 11/1999 | Smith et al. ................ 455/406 |
| 6,029,062 A | 2/2000 | Hanson ....................... 455/408 |
| 6,035,025 A | 3/2000 | Hanson ....................... 379/144 |
| 6,058,300 A | 5/2000 | Hanson ....................... 455/406 |
| 6,070,067 A | 5/2000 | Nguyen et al. ............. 455/407 |
| 6,075,982 A | 6/2000 | Donovan et al. ........... 455/406 |
| 6,078,805 A | 6/2000 | Scott .......................... 455/406 |
| 6,226,364 B1 | * 5/2001 | O'Neil ....................... 379/114.2 |

* cited by examiner

Primary Examiner—Cong Van Tran
(74) Attorney, Agent, or Firm—John T. Peoples

(57) ABSTRACT

A global prepaid roaming services method and apparatus is described in which a roaming phone located in a first region places an outgoing call to a destination party in a second region, and responsive to placing the call, a service processing node (SPN) establishes a first call connection between the roaming phone and the SPN, a second call connection between the SPN and the destination party is established and the SPN bridges the first and second call connections to establish a call connection between the roaming phone and the destination party. Incoming calls originating in a first region made to a wireless phone roaming in a second region are established by signaling from the first region to a home region associated with the wireless phone in order to determine that the wireless phone is roaming in the second region; signaling a cellular-switching center (CSC) in the second region, responsive to the determination that the wireless phone is roaming in the second region, to inform the CSC in the second region of a call connection request to the wireless phone; routing the call, responsive to the call connection request, from the CSC in the second region to a service processing node (SPN) in the second region and establishing a first call connection from the originating first region to the SPN in the second region; launching a message from the SPN in the second region to the wireless phone, the message instructing the wireless phone to establish a second call connection with the SPN in the second region; and bridging the first call connection with the second call connection, responsive to establishing the second call connection with the SPN.

23 Claims, 14 Drawing Sheets

CELL-PHONE SWITCHING CENTER (CSC)
200

MOBILE SWITCHING CENTER (MSC)
210

VISITOR LOCATION REGISTER (VLR)
220

HOME LOCATION REGISTER (HLR)
230

FIG. 2

**CENTRAL PREPAID
ACCOUNTS DATA CENTER
(CPADC)
400**

CALL PROCESSOR
410

MEMORY 420

CENTRAL PREPAID
ACCOUNTS DATABASE
(CPAD) 430

PREPAID-PRODUCT RULES
DATABASE
(PRD) 440

CELL PHONE ROAMING
AGENT POOL
(CPRAP) 450

PROGRAM 460

FIG. 4

PREPAID ACCOUNTS DATABASE (PAD) 500

| PREPAID ACCOUNT IDENTIFIER 510 | PREPAID PHONE NUMBER 520 | BALANCE AMOUNT 530 |
|---|---|---|
| 2592 | 123-345-7890 | 5217.65 |
| 1521 | 123-333-5555 | 3511.67 |

PREPAID PRODUCT RULES DATABASE (PRD)
600

| PREPAID ACCOUNT IDENTIFIER 610 | PREPAID-PRODUCT IDENTIFIER 620 | PRODUCT RULES 630 |
|---|---|---|
| 2592 | STAR | 1) 0.55 per Minute<br>2) Countries M and N only |
| 1521 | PLANET | 1) 0.35 per minute<br>2) Countries L, M and N only |

R3 → (row 1)
R4 → (row 2)

FIG. 6

GLOBAL WIRELESS PREPAID ROAMING

FIELD OF THE INVENTION

The present invention relates to the field of global wireless roaming, and more particularly to the application of prepaid services to global roaming.

BACKGROUND OF THE INVENTION

Prepaid telephone services entitle the owner or representative of the prepaid services to make phone calls debited against a stored value account. Initially, such prepaid services were limited to land line phones, but more recently, prepaid services have been extended to wireless phones as well. Such prepaid wireless services have captured a significant portion of the wireless market, and the prepaid wireless services portion is capturing market share growth even more rapidly than the wireless communications field in general. The ability to use such wireless prepaid services in a global roaming environment would be extremely attractive, but such a realization is hampered by limitations associated with the existing infrastructure.

Specifically, although next generation mobile switching centers which monitor and report real-time call details currently do exist, implementation is not yet pervasive and certainly not universal. Therefore, the current prepaid infrastructure does not support global wireless roaming; that is, global roaming is available only on a post-paid basis. Prior art attempts at providing global wireless roaming all inherently include one or more of the following shortcomings: (i) available only on a post-paid basis, (ii) all traffic must be connected through the provider home country, and/or (iii) real-time account decrementing (for prepaid accounts) is only available on a flat rate basis.

SUMMARY OF THE INVENTION

These and other limitations associated with the prior art are overcome by utilizing a global prepaid roaming services method and apparatus in which a roaming phone located in a first region places an outgoing call to a destination party in a second region, and responsive to placing the call, a service processing node (SPN) establishes a first call connection between the roaming phone and the SPN, a second call connection between the SPN and the destination party is established, and the SPN bridges the first and second call connections to establish a call connection between the roaming phone and the destination party.

In second embodiment of the present invention, a call originating in a first region to a wireless phone roaming in a second region in a global prepaid roaming services scheme, is established by signaling from the first region to a home region associated with the wireless phone in order to determine that the wireless phone is roaming in the second region; signaling a cellular-switching center (CSC) in the second region, responsive to the determination that the wireless phone is roaming in the second region, to inform the CSC in the second region of a call connection request to the wireless phone; routing the call, responsive to the call connection request, from the CSC in the second region to a service processing node (SPN) in the second region and establishing a first call connection from the originating first region to the SPN in the second region; launching a message from the SPN in the second region to the wireless phone, the message instructing the wireless phone to establish a second call connection with the SPN in the second region; and bridging the first call connection with the second call connection, responsive to establishing the second call connection with the SPN.

BRIEF DESCRIPTION OF THE DRAWINGS

A more complete understanding of the present invention may be obtained from consideration of the following description in conjunction with the drawings in which:

FIG. 2 is a block diagram of an exemplary cell-phone switching center, in accordance with the principles embodied in the present invention;

FIG. 4 is a block diagram of an exemplary central prepaid accounts data center, in accordance with the principles embodied in the present invention;

FIG. 5 is a representation of an exemplary prepaid accounts database used in accordance with the principles embodied in the present invention;

FIG. 6 is a representation of an exemplary prepaid product rules database used in accordance with the principles embodied in the present invention;

DETAILED DESCRIPTION

Three possible implementations with which to provide global prepaid roaming for wireless phones are presented:

Implementation 1

Prepaid calls to a given region may all be directed to a common node that has real-time call detail, monitoring, and billing capability. The node bills each call in real-time, decrements an account's prepaid value in real-time, and terminates a call when the prepaid value is approached or exhausted. A major disadvantage associated with this implementation is that a service provider must build an infrastructure with several such nodes per region to provide service coverage, to minimize the costs of long distance calls, and to distribute call processing.

Implementation 2

Roaming customers are allowed to use only some percentage of prepaid value in their prepaid accounts. When the call is completed, the prepaid account is decremented for the charges incurred. However, this approach is prone to fraudulent usage and/or overcharges, as there is no way to recover the cost of call connection fees in excess of the value originally available in the prepaid account.

Implementation 3

Within the home area where real-time call measurement is possible, a prepaid methodology is followed. Outside the home area, a post-paid methodology is used. This method also is susceptible to lost service fees for the same reasons described in conjunction with Implementation 2.

Figure 1:
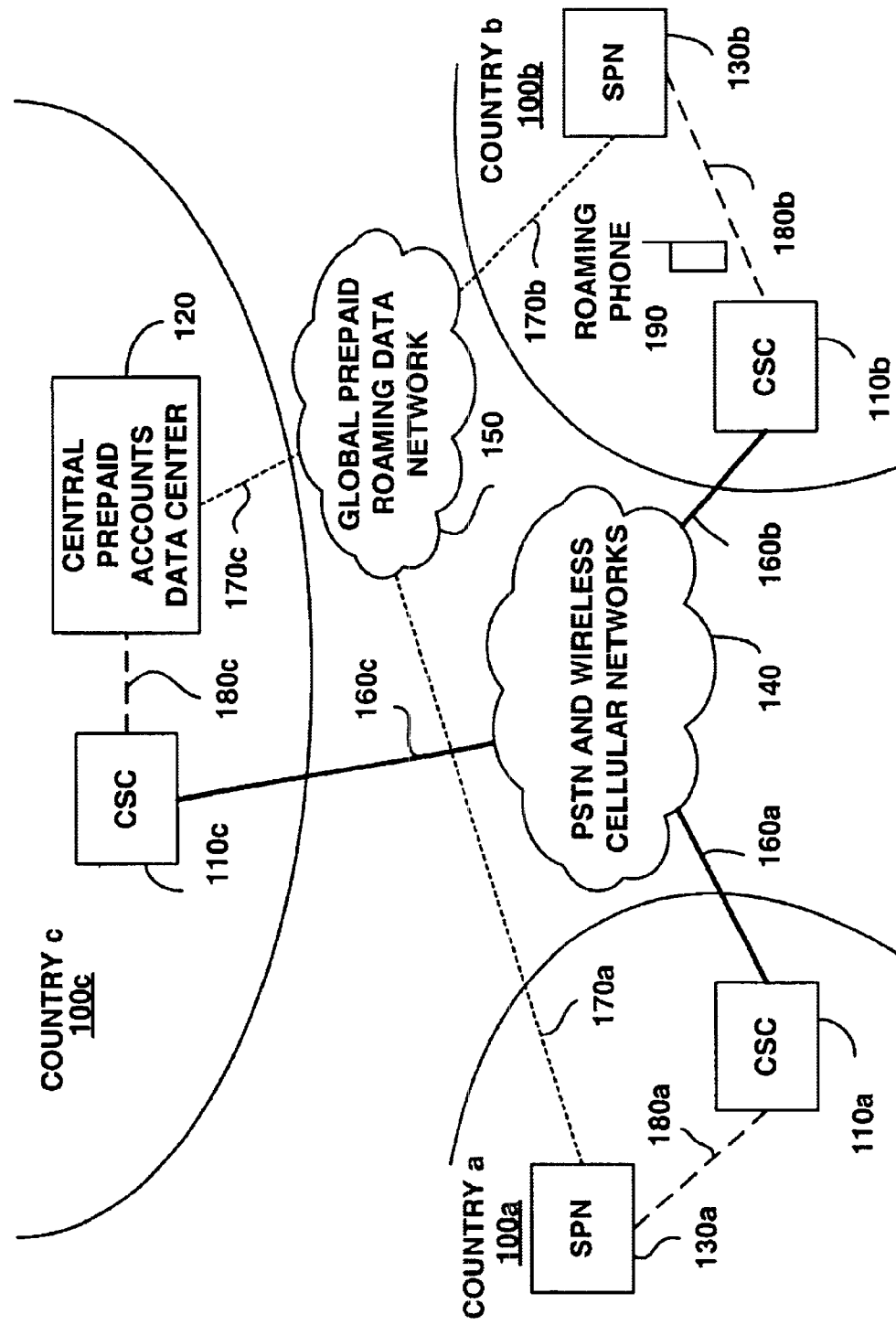
FIG. 1 is a block diagram of an exemplary embodiment of a network architecture utilized for global wireless prepaid roaming, in accordance with the principles embodied in the present invention.

FIG. 1 is a block diagram of an exemplary embodiment of a network architecture utilized for global wireless prepaid roaming, in accordance with the principles embodied in the present invention. Illustratively, three regions or countries (countries a-through c 100a–c) are shown, although the number of regions or countries in which the present invention may be implemented is virtually unlimited. Furthermore, although for descriptive purposes each region is referred to as a country, the principles of the present invention apply equally to implementations in which several regions exist within a single country, or alternatively, in implementations in which several countries exist within a single region. Each region or country maintains at least one Cell-phone Switching Center (CSC) 110a–c. The CSCs are wireless switching centers for any cell-phone service provider. In at least one region or country, a Central Prepaid Accounts Data Center (CPADC) 120 is located. Other regions/countries have one or more service processing nodes (SPNs). Again for illustrative purposes only, a single SPN 130a,b per country is shown. The CPADC 120 maintains the functionality of a SPN, and in addition includes additional functionality, subsequently described. The CSCs 110a–c are interconnected by communication links 160a–c via the Public Switched Telephone Network (PSTN) and other proprietary and non-proprietary wireless cellular networks 140, in a well known manner. The SPNs and CPADC are interconnected via data communication links 170a–c to network, here illustrated as the Global Prepaid Roaming Data Network 150. The Global Prepaid Roaming Network may be implemented over existing infrastructure which may include proprietary and non-proprietary networks. One such network over which the Global Prepaid Roaming Network may be implemented is via the Internet, although such an example is merely illustrative and not meant as a limitation. The CSCs are coupled to the servicing SPN or CPADC by communication links 180a–c. A single roaming wireless phone 190 is shown in FIG. 1 for illustrative purposes.

FIG. 2 is a block diagram of an exemplary cell phone switching center (CSC) 200, in accordance with the principles embodied in the present invention. As is well known in the art, the CSC 200 includes the functionality of a wireless/mobile switching center (MSC) 210 which manages the routing and switching of calls to and from serviced mobile phones. The Visitor Location Register (VLR) 220 is a database which includes information pertaining to cellphones which are visiting (roaming) the region or country which the MSC 210 services. Each activated cell-phone has a registered home location and the corresponding home CSC 200 includes account and authorization information for each phone registered to the region or country that CSC 200 services. The Home Location Register (HLR) 230 is the database that maintains the current location information of cell phones registered with that CSC 200, the home location. The elements of the recited CSC architecture are standard elements in the Global System for Mobile (GSM) Communications network.

Figure 3:
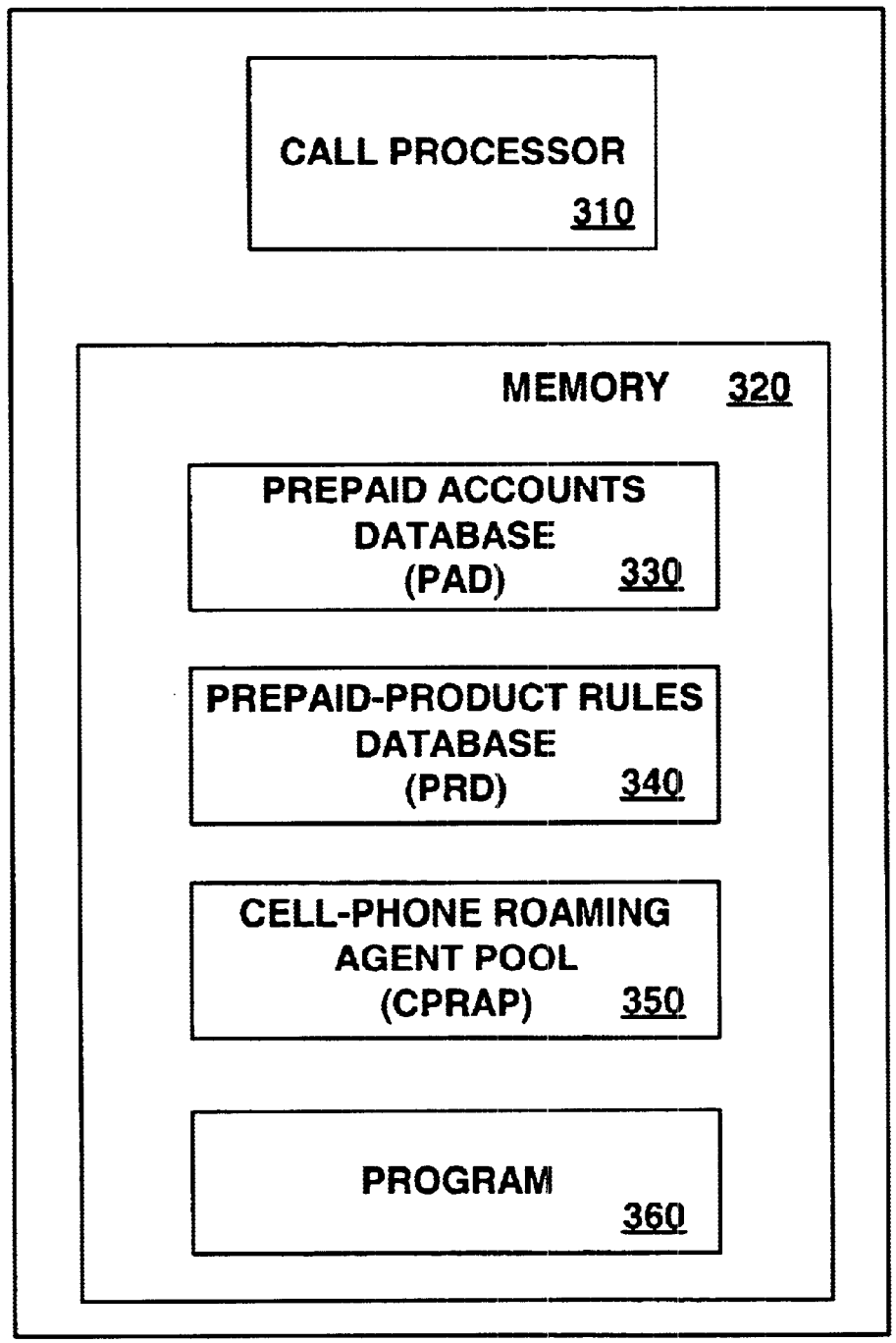
FIG. 3 is a block diagram of an exemplary service processing node, in accordance with the principles embodied in the present invention.

FIG. 3 is a block diagram of an exemplary service processing node (SPN) 300, in accordance with the principles embodied in the present invention. The call processor 310 performs well known call processing functions for calls originating or terminating at roaming cell phones. The call processor 310 also performs on-line real-time prepaid account management and call management functions. Memory 320 maintains databases and stores application programs used by the call processor 310. The Prepaid Accounts Database (PAD) 330 includes prepaid account balance data corresponding to roaming cell phones. The Prepaid-Product Rules Database (PRD) 340 is used to maintain a set of rules used for particular services available to subscribers and rules for updating prepaid account data for a roaming phone based on the type of prepaid product bought by a user. The Cell Phone Roaming Agent Pool (CPRAP) 350 is a dynamically changing set of programs associated with individual roaming phones. Memory 320 also stores application program 360, which includes instructions for controlling the call processor 310 in accordance with the principles of the present invention, and particularly in accordance with the process described in conjunction with FIGS. 7–9 and 11.

FIG. 4 is a block diagram of an exemplary central prepaid accounts data center (CPADC) 400, in accordance with the principles embodied in the present invention. The functionality associated with the CPADC 400 are the same as those associated with the SPN 300. Additionally, the CPADC 400 maintains a Central Prepaid Accounts Database (CPAD) 430 in memory 420. CPAD 430 stores prepaid account information for roaming phones operating in the global roaming system. The call processor 410 performs well known call processing functions for calls originating or terminating at roaming cell phones in the region serviced by the CPADC 400. The CPADC 400 additionally performs on-line real-time prepaid account management and prepaid call management functions. The Prepaid Product Rules Database (PRD) 440 and Cell Phone Roaming Agent Pool (CPRAP) 450 are similar to PRD 340 and CPRAP 350 associated with a SPN 300 as described in conjunction with FIG. 3. Memory 420 also stores program 450 which includes instructions for controlling the processor 410 in accordance with the principles of the present invention, and particularly in accordance with the process described in conjunction with FIGS. 7–9 and 11.

With respect to FIGS. 5 and 6, it is understood that the various rows and columns illustrated as comprising the databases represent records and fields, respectively. Thus, in each of the various described embodiments, the databases are used in a relational arrangement, as is known in the art, so that the databases relate to one another by way of fields that store common pertinent data. It is noted that while the following description refers to specific individual databases, formats, records, and fields, those skilled in the art will readily appreciate that various modifications and substitutions may be made thereto without departing from the spirit and scope of the present invention.

FIG. 5 is a representation of an exemplary prepaid accounts database (PAD) 500 used in accordance with the principles embodied in the present invention. The PAD 500 stores data relating to prepaid accounts that are maintained for prepaid account holders. Each record (row) of database 500 represents such an account. For exemplary purposes two records, row R1 and R2, are shown. Field 510 stores a prepaid account identifier that is associated with and that uniquely identifies a specific prepaid account. Field 520 is used to store the prepaid phone number associated with the account. Field 530 stores the prepaid account balance.

FIG. 6 is a representation of an exemplary prepaid product rules database (PRD) 600 used in accordance with the principles embodied in the present invention. The PRD 600 stores data relating to one or more prepaid accounts. One record (row) of the PRD 600 is maintained for each prepaid account. For exemplary purposes two records, R3 and R4, are shown. Field 610 stores a prepaid account identifier that is associated with and that uniquely identifies a specific prepaid account. Field 620 is used to store a prepaid-product identifier to that identifies one or more specific prepaid products associated with the account. Field 630 stores product rules corresponding to the identified prepaid product identifier 620. In the exemplary embodiment illustrated in FIG. 6, the product rules field 630 includes availability and rate information corresponding to roaming phone users in particular countries. The specific rules shown in FIG. 6 are merely illustrative, and it would be understood by those skilled in the art that any number of rules and rules-bases may be constructed and still operate in accordance with the principles embodied in the present invention.

Figure 7:
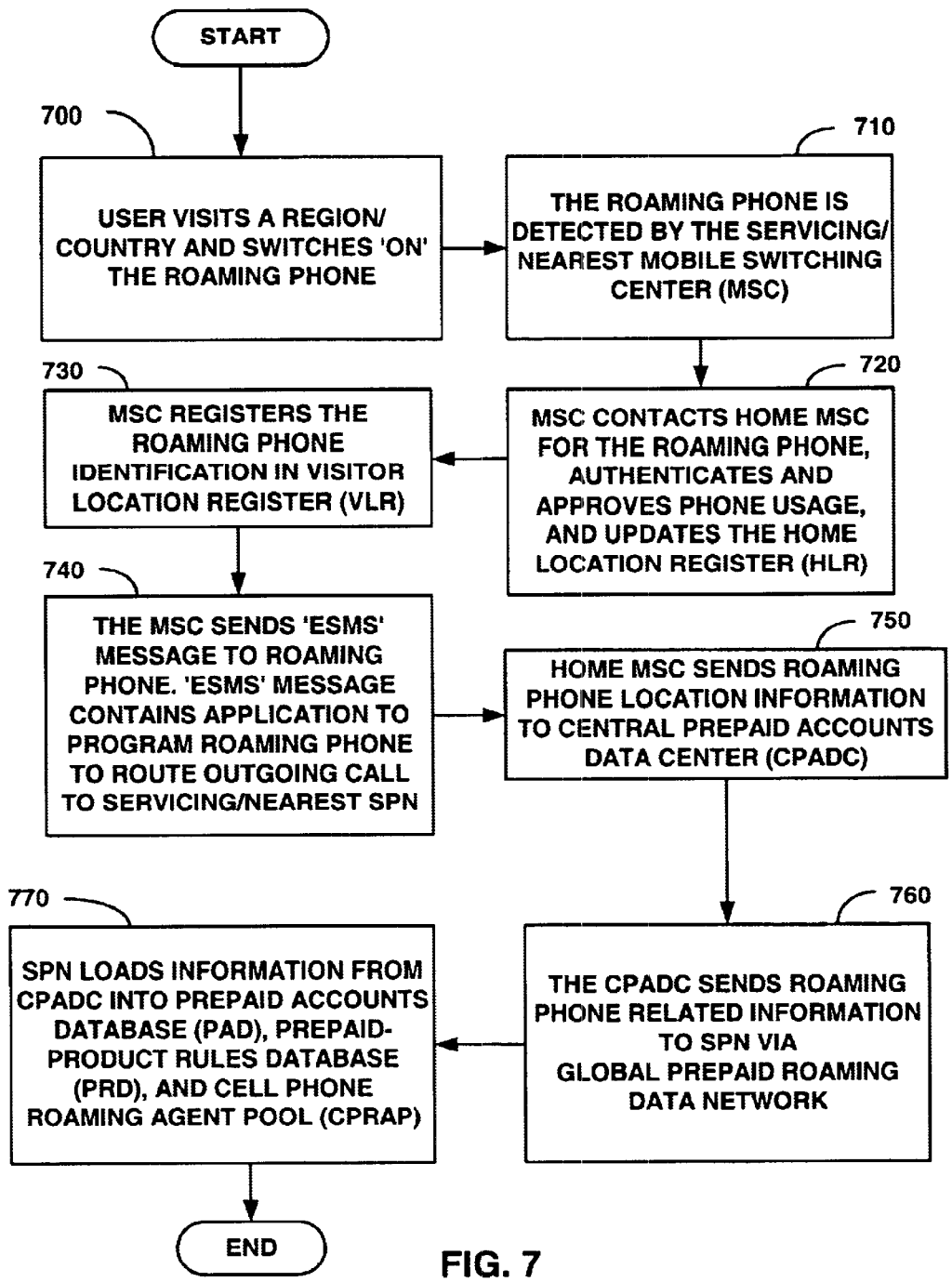
FIG. 7 is a flow chart illustrating an exemplary method for roaming mobile phone detection and registration, in accordance with the principles embodied in the present invention.

FIG. 7 is a flow chart illustrating an exemplary method for roaming mobile phone detection and registration, in accordance with the principles embodied in the present invention. In accordance with step 700, a mobile phone user enters a country in which he must roam and switches on his cellular phone. The phone automatically detects a wireless transmission from the nearest MSC and responds by sending its cellular phone identification information to the MSC. In accordance with step 710, the MSC receives the cellular phone identification information and thus detects the cellular phone and classifies the phone as a roaming phone, since the phone is not included in its HLR database. In accordance with step 720, the MSC communicates with the home MSC of the roaming phone via the wireless cellular network 140, authenticates the phone usage, and updates the HLR at the home location with the new location information for the roaming cellular phone. In accordance with step 730, the MSC registers the roaming phone identification information in its VLR. In accordance with step 740, the MSC launches an Executable Short Message Service (ESMS) message (or equivalent message) with application program content to the roaming cellular phone. The ESMS (or equivalent message) is used to configure the roaming cellular phone so that it will first contact the nearest SPN (or servicing SPN) when making an outgoing call (instead of having the MSC connecting the call directly to the called party). In accordance with step 750, the home MSC sends information pertaining to the roaming cellular phone location to the central prepaid accounts data center (CPADC). Alternatively, instead of the MSC sending the information about the cellular phone and its location, the cellular phone itself sends an SMS message to the CPADC containing information such as location data of the MSC, wireless network identification of the MSC, and time-of-day, in addition to information specific to the roaming phone itself. The MSC related information is obtained by the roaming phone through the transmissions from the MSC during the cellular phone registration. In accordance with step 760, the CPADC forwards the applicable prepaid account balance information, roaming phone product rules and program to the SPN nearest to or servicing the roaming cellular phone using a proprietary data network, such as the Global Prepaid Roaming Data Network, or in the alternative, a non-proprietary network, such as the Internet. Upon receipt and in accordance with step 770, the SPN loads the information received from the CPADC corresponding to the roaming cellular phone into the prepaid accounts database (PAD), prepaid product rules database (PRD) and cell phone roaming agent pool (CPRAP) database, completing the roaming cellular phone registration process for roaming in the visited region or country.

Figure 8:
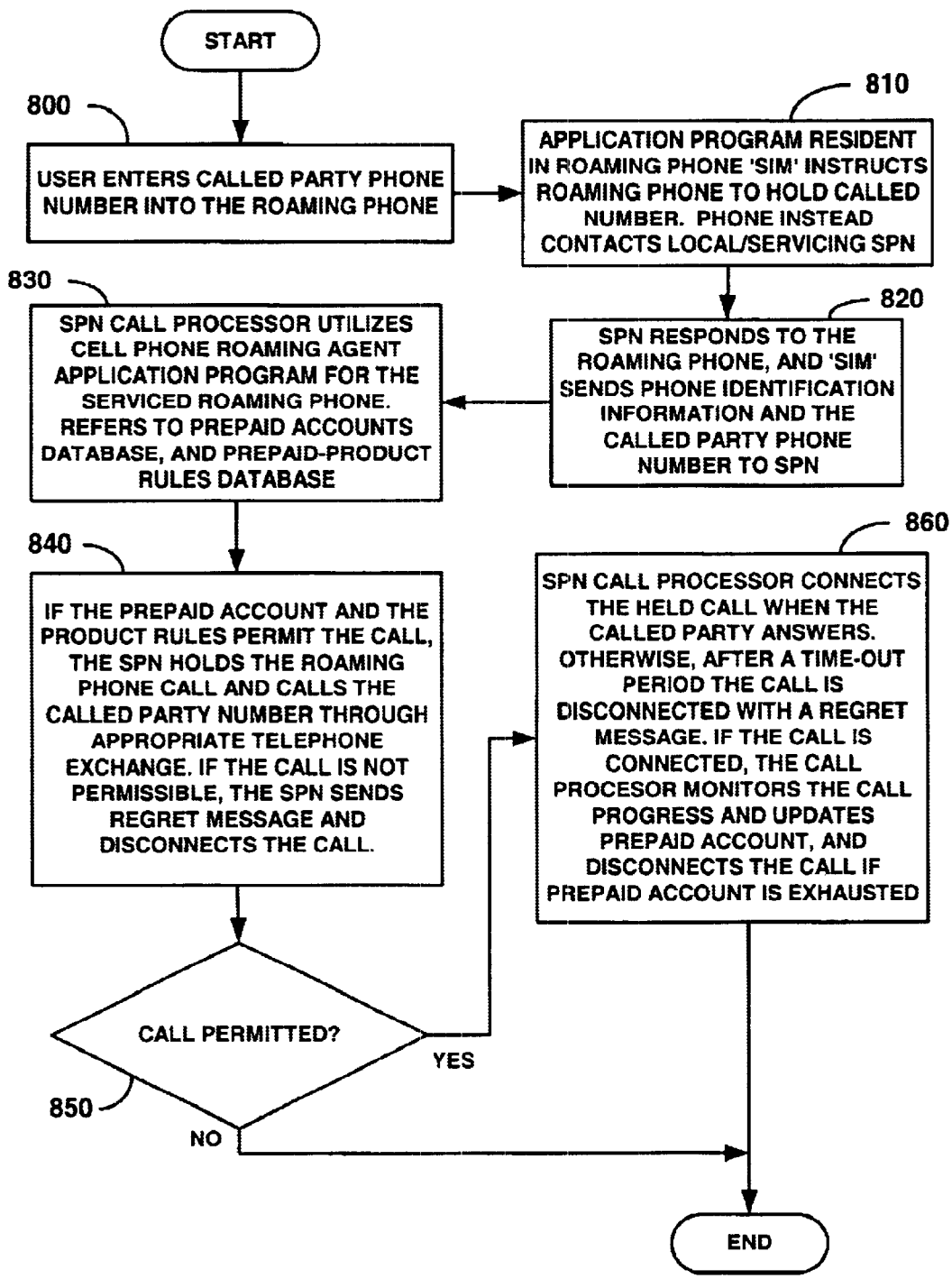
FIG. 8 is a flow chart illustrating an exemplary method for establishing an outgoing call from a roaming phone, in accordance with the principles embodied in the present invention.

FIG. 8 is a flow chart illustrating an exemplary method for establishing an outgoing call from a roaming phone, in accordance with the principles embodied in the present invention. In accordance with step 800, user enters the phone number of the called party into the roaming phone and presses the cell phone's call/send button. In accordance with step 810, the roaming phone temporarily stores the called phone number in memory, and calls the number of the nearest/servicing local SPN establishing a call connection between the roaming phone and the SPN. In accordance with step 820, the call processor of the servicing SPN acknowledges, and in response, the roaming phone sends its identification information and the phone number of the called party to the SPN. In accordance with step 830, the SPN launches and utilizes the roaming agent application program for the roaming phone, and utilizes the prepaid accounts database and prepaid products rules database to provide calling service to the roaming phone. In accordance with steps 840 and 850, the call processor temporarily detains call completion to verify whether the prepaid account and product rules permit completion of the phone call. For example, one such prepaid and product rules test prior to connecting a call is whether or not sufficient funds exist within the assigned prepaid account to permit call completion. In accordance with step 850, if the call is not permitted, then the call completion process is aborted or otherwise terminated, preferably accompanied with an appropriately polite termination message from an announcement platform at the SPN, explaining the reason that the call attempt was not completed. If however, the call is permitted, then the call processor initiates a call connection from the SPN to the called number, in accordance with step 860. Once connected, the called SPN bridges the call connection from SPN to called number with the call connection between the SPN and the roaming phone, thus establishing a call connection between the roaming phone and the called party at the called number. If the called party does not answer or is busy, the roaming phone call is disconnected. The call record and call details associated with a successfully placed call are monitored by the SPN call processor, in real-time, and the prepaid account balance is therefore updated (typically decremented) in real-time according to usage. If the prepaid account balance is exhausted, or an established threshold quantity is exceeded, the call connection may be terminated.

Figure 9:
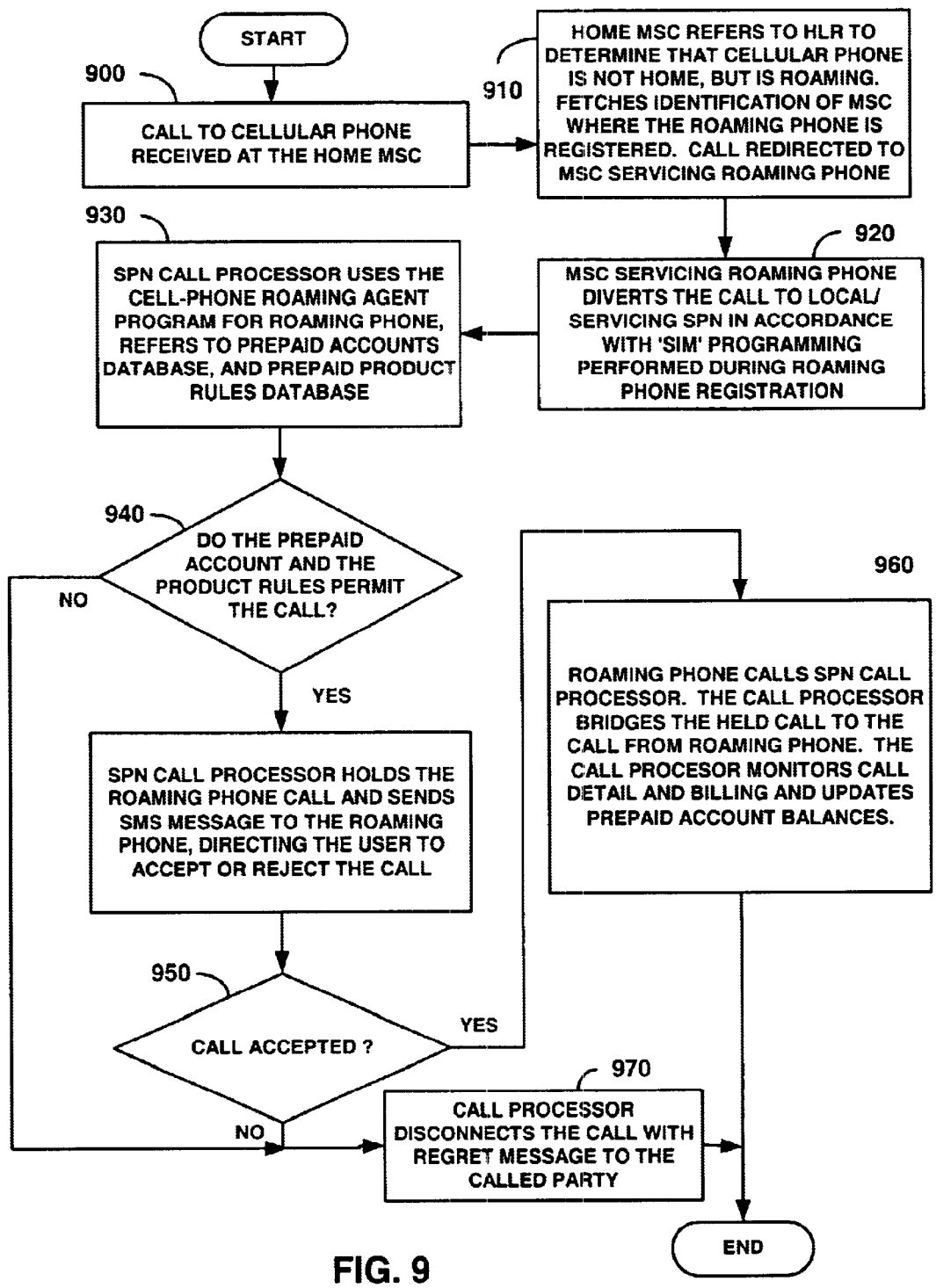
FIG. 9 is a flow chart illustrating an exemplary method for placing an incoming call to a roaming phone, in accordance with the principles embodied in the present invention.

FIG. 9 is a flow chart illustrating an exemplary method for placing an incoming call to a roaming phone, in accordance with the principles embodied in the present invention. In accordance with step 900, a call made to the roaming phone is first directed to the home MSC. In accordance with step 910, the home MSC refers to its HLR to determine the location in which the roaming phone is roaming. In response to this determination, the call is redirected to the MSC in the country/region in which the roaming phone is roaming. In accordance with step 920, the call is redirected from the MSC to the SPN in the country/region in which the roaming phone is roaming, responsive to programming performed during initial registration of the roaming phone when powering up in the country/region. Prepaid account data and other pertinent phone information are initialized during the registration process and are already present at the country/region SPN. In accordance with steps 930, 940, the SPN call processor performs a check to determine whether the prepaid account and product rules permit completion of the phone call. For example, one such prepaid and product rules test prior to connecting a call is whether or not sufficient funds exist within the assigned prepaid account to permit call completion. If the call is not permitted, then the SPN call completion process is aborted or otherwise terminated, preferably accompanied with an appropriately polite termination message from an announcement platform at the SPN, explaining the reason that the call attempt was not completed, in accordance with step 970. If however, the call is permitted, then a message, such as an SMS message, is sent from the SPN call processor to the roaming phone, informing the roaming phone that an incoming call is available and requesting the user of the roaming phone to enter a response (via keypad, voice recognition, or other device or method) indicating whether the user wishes to accept or reject the incoming call, in accordance with step 950. Specific call data such as Caller ID information or call origination location may be supplied, if available, to aid the roaming phone user in making a response. If the roaming phone user wishes to accept the call, then data and application stored in the roaming phone SIM during registration directs the roaming phone to call the servicing SPN, in accordance with step 960. The SPN call processor then bridges the call connection from the call originator to the SPN with the call connection between the roaming phone and the SPN, thus establishing a call connection between the calling party and the roaming phone. The call record and call details associated with a successfully placed call are monitored by the SPN call processor, in real-time, and the prepaid account balance is therefore updated (typically decremented) in real-time according to usage. If the prepaid account balance is exhausted, or an established threshold quantity is exceeded, the call connection may be terminated.

Figure 10:
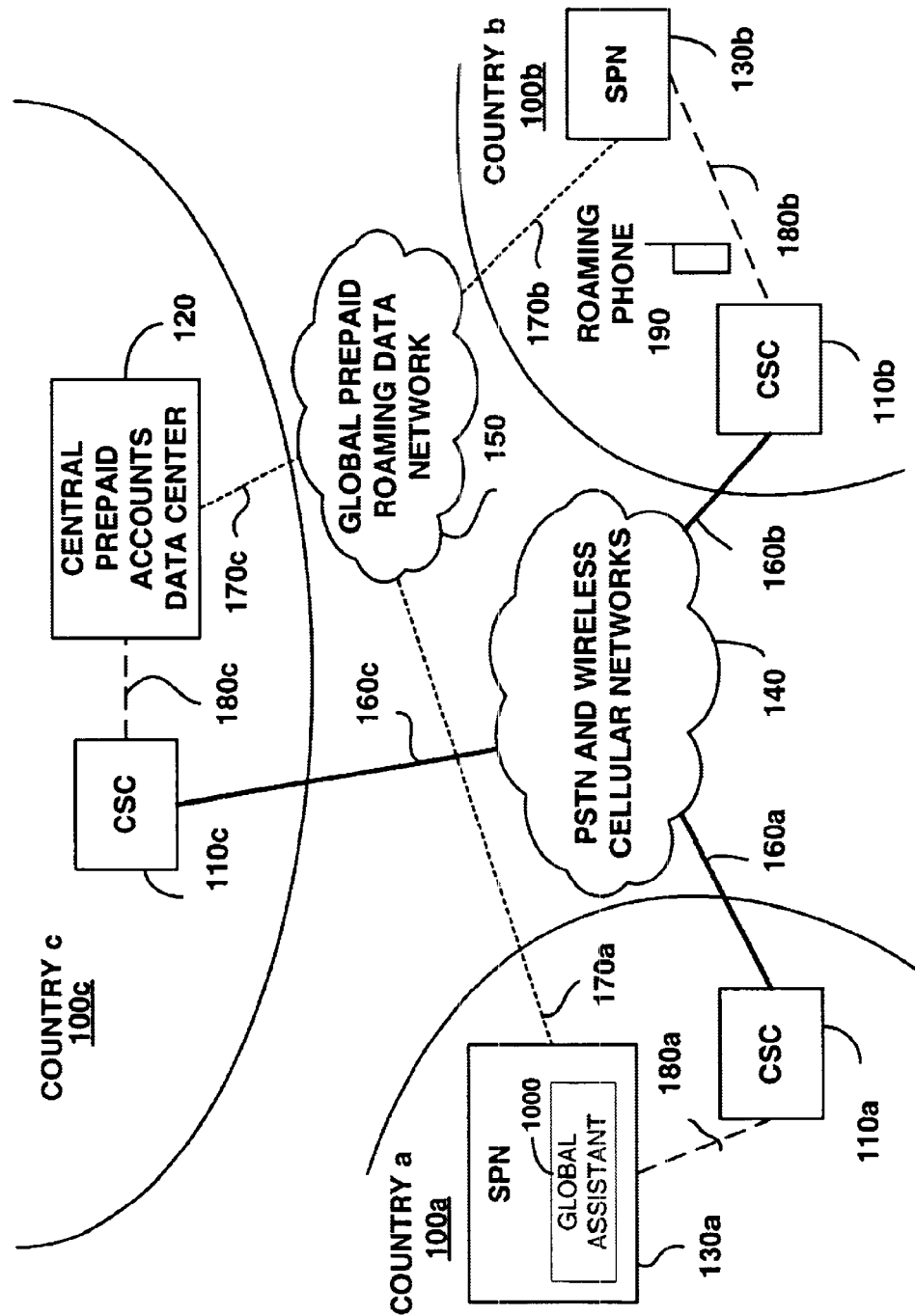
FIG. 10 is a block diagram of an exemplary embodiment of a network architecture utilized for global wireless prepaid roaming incorporating a global assistant, in accordance with the principles embodied in the present invention.

One illustrative embodiment of the present invention is shown in FIG. 10 in which a mobile phone user is assigned a global assistant 1000. The global assistant 1000 is implemented within at least one SPN 130a, as an illustrative example. The global assistant 1000 may be implemented in the SPN corresponding to the mobile phone's home country/region, although such a limitation is not a requirement, and therefore the global assistant 1000 may be implemented in the SPN of any country/region. The global assistant 1000 enhances the services available to the mobile phone user by enabling value-added services such as automated/manual outgoing proxy calls and sending or receiving faxes and e-mails. Other value-added services may also be included within the global assistant platform. Other than the additional functionalities associated with the addition of the global assistant 1000, a detailed description of FIG. 10 is the same as that presented in conjunction with FIG. 1.

Figure 11:
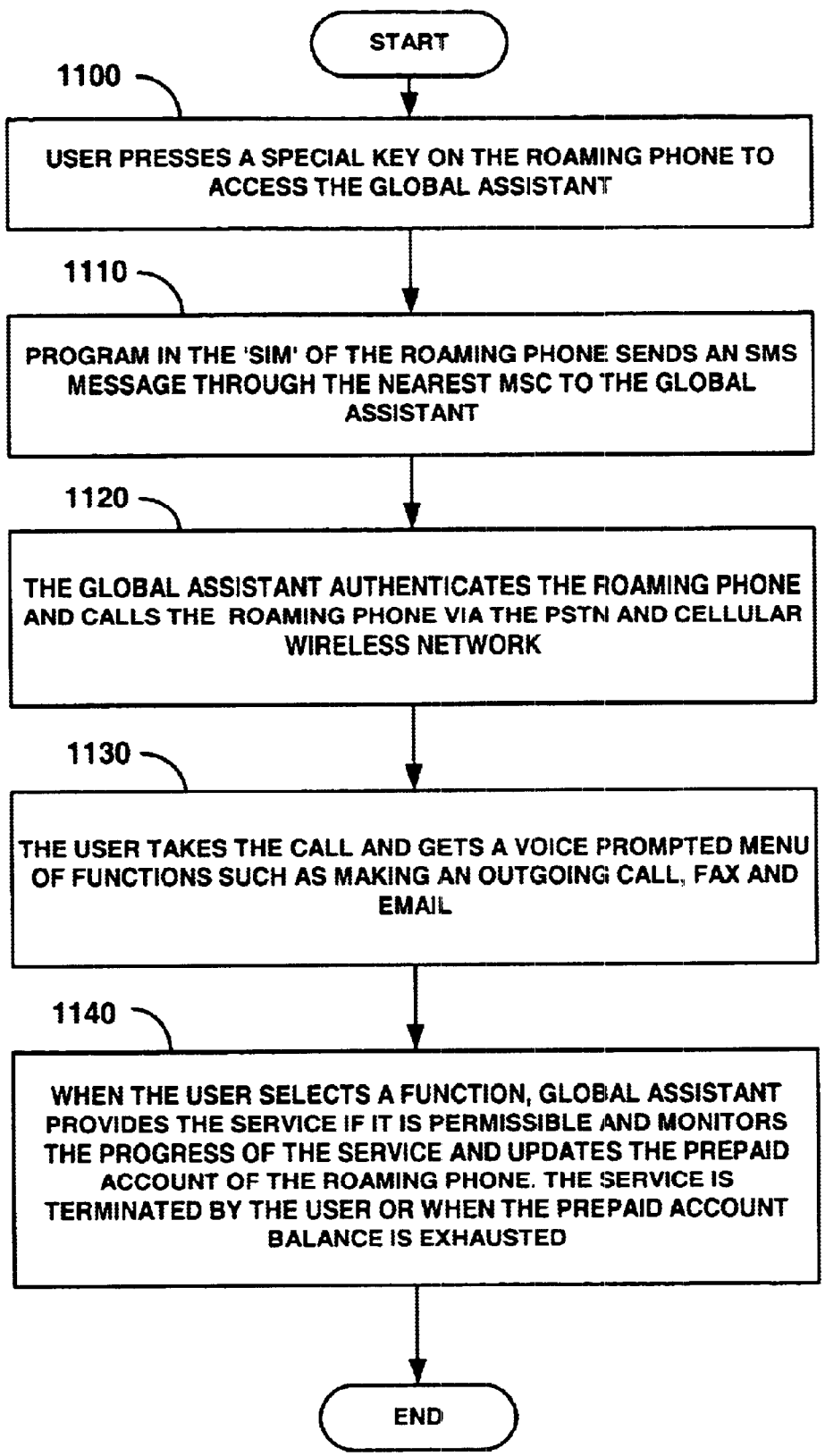
FIG. 11 is a flow chart illustrating an exemplary method for obtaining call services through the use of a global assistant, in accordance with the principles embodied in the present invention.

FIG. 11 is a flow chart illustrating an exemplary method for obtaining call services through the use of a global assistant, in accordance with the principles embodied in the present invention. In accordance with step 1100, a global assistant service feature is requested by pressing a designated button or combination of buttons on the keypad of a roaming phone (although other means for requesting global assistant services may also be utilized without departing from the spirit or scope of the invention, such as voice recognition). In accordance with step 1110, the programmed SIM of the roaming phone sends an SMS message to the global assistant through the nearest/servicing MSC that has registered the phone. In accordance with step 1120, the global assistant verifies the prepaid account and product rule information for the phone and authenticates the access of service by the roaming phone. The global assistant then calls the roaming phone through PSTN and cellular wireless network. In accordance with step 1130, when the user answers the call, a voice prompted message is delivered to the user prompting the user to select the desired service or function. In accordance with step 1140, upon selection of a service or function, the global assistant provides the requested service subject to the adequacy of the prepaid account balance and service permissibility. Calls incoming to the roaming phone are handled in a similar manner as described earlier, except through a global assistant call processor instead of a regular call processor within a SPN.

Figure 12:
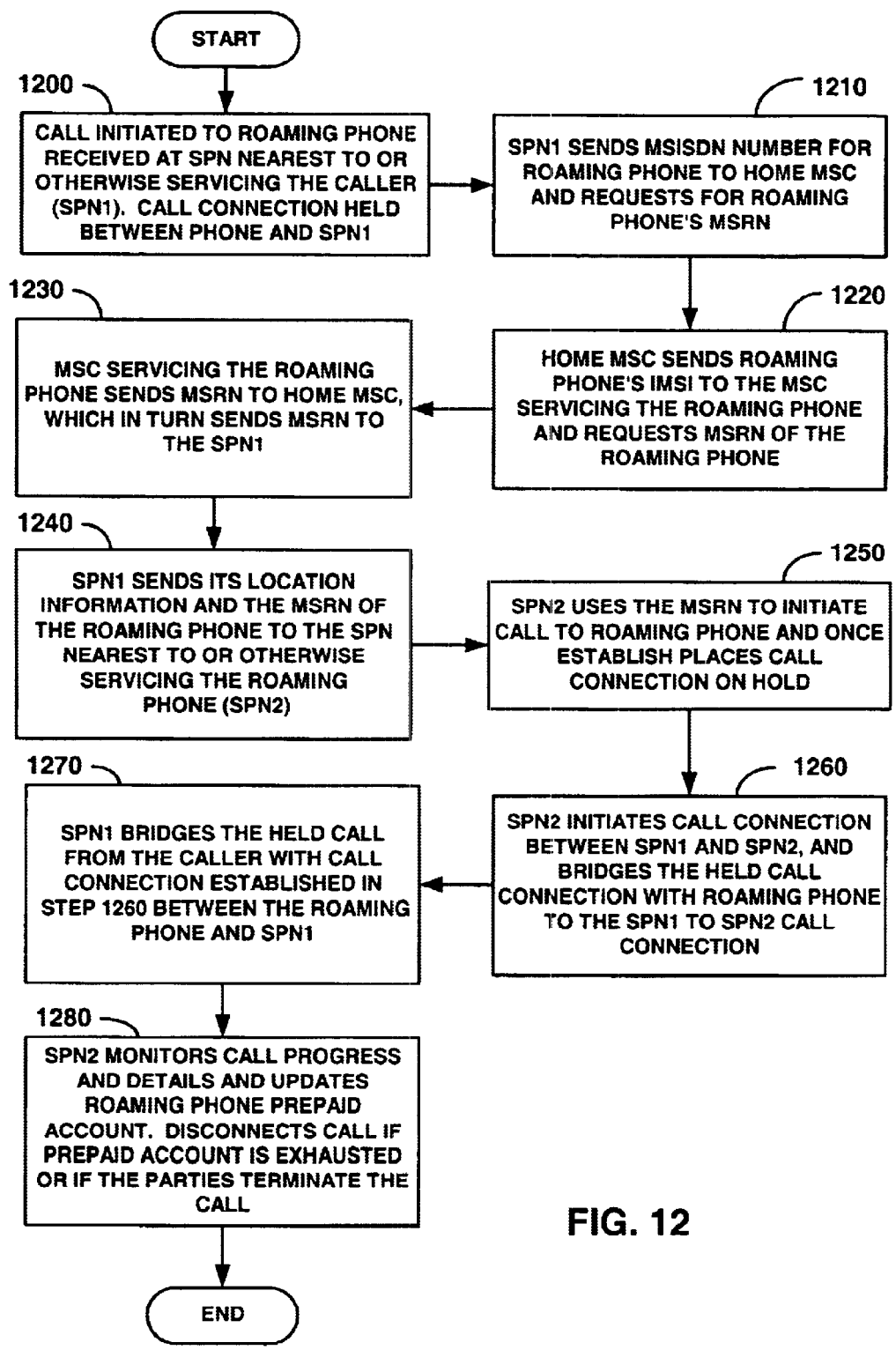
FIG. 12 is a flow chart illustrating another exemplary method for placing an incoming call to a roaming phone, in accordance with the principles embodied in the present invention.

FIG. 12 is a flow chart illustrating another exemplary method for placing an incoming call to a roaming phone, in accordance with the principles embodied in the present invention. In accordance with step 1200, a call made to the roaming phone is first directed to an SPN nearest to or servicing the caller (defined as $SPN_1$ for purposes of this description). One method for routing the call to $SPN_1$ is to use a toll-free or other specified phone number to call $SPN_1$. An alternative method for routing the call to $SPN_1$ is for the caller to call the home location phone number assigned to the called party and the resulting call is then redirected to $SPN_1$. $SPN_1$ then determines the Mobile Subscriber Integrated Services Digital Network (MSISDN) number of the roaming phone either (i) by querying the caller, or (ii) by referring to pre-stored phone number mapping tables. In accordance with step 1210, SPN1 sends the MSISDN number of the roaming phone to the home MSC and launches a request for the Mobile Subscriber Roaming Number (MSRN) of the roaming phone. In accordance with step 1220, home MSC sends the International Mobile Subscriber Identity (IMSI) associated with the roaming phone to the MSC servicing the roaming phone, and queries the MSC servicing the roaming phone to supply the MSRN of the roaming phone. In accordance with step 1230, the MSRN sent by the MSC servicing the roaming phone is received by SPN1 via the home MSC. In accordance with step 1240, SPN1 transmits its location information (for example, its Point Code in a Signaling System 7 (SS7) context) and the MSRN of the roaming phone to an SPN servicing the roaming phone (defined as $SPN_2$ for purposes of this description). $SPN_2$ is selected/determined by knowing the MSRN and location information for all of the SPNs, which are stored at $SPN_1$ (as they are at all other SPNs as well). The information is sent to $SPN_2$ using a proprietary data network, such as the Global Prepaid Roaming Data Network, or in the alternative, a non-proprietary network such as the Internet. In accordance with step 1250, $SPN_2$ utilizes the MSRN to call the roaming phone and holds the call upon response by roaming phone user. In accordance with step 1260, $SPN_2$ initiates a call to $SPN_1$ utilizing the location information provided and then bridges the held call connection to the roaming phone with the call connection established between $SPN_2$ and $SPN_1$. In accordance with step 1270, $SPN_1$ bridges the call connection from the originating caller to $SPN_1$ with the call connection between the roaming phone and the $SPN_1$, thus establishing a call connection between the calling party and the roaming phone. In accordance with step 1280, the call record and call details associated with a successfully placed call are monitored by the SPN call processor, in real-time, and the prepaid account balance is therefore updated (typically decremented) in real-time according to usage. If the prepaid account balance is exhausted, or an established threshold quantity is exceeded, the call connection may be terminated.

Figure 13:
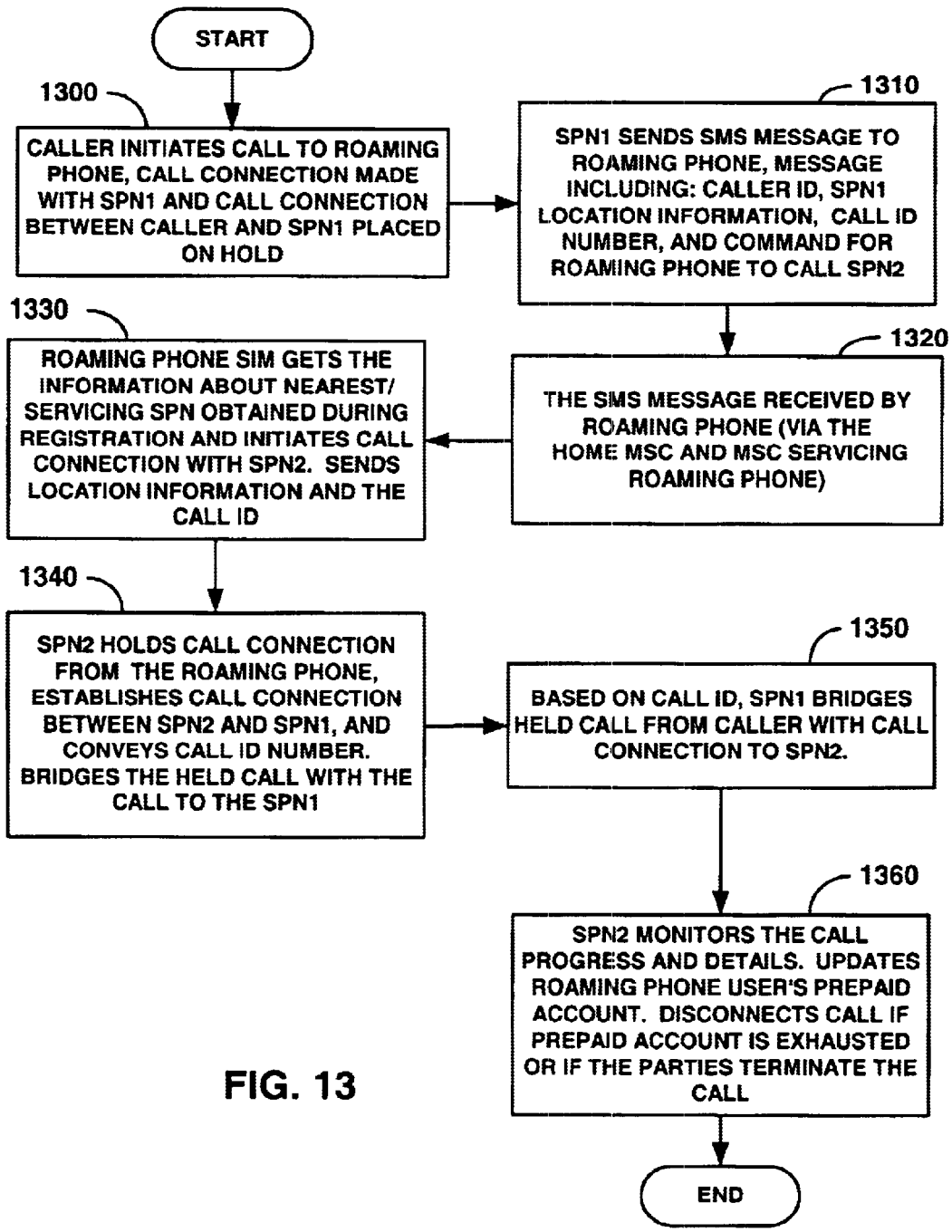
FIG. 13 is a flow chart illustrating yet another exemplary method for placing an incoming call to a roaming phone, in accordance with the principles embodied in the present invention.

FIG. 13 is a flow chart illustrating yet another exemplary method for placing an incoming call to a roaming phone, in accordance with the principles embodied in the present invention. In accordance with step 1300, a call made to the roaming phone is first directed to an SPN nearest to or servicing the caller (defined as $SPN_1$ for purposes of this description). One method for routing the call to $SPN_1$ is to use a toll-free or other specified phone number to call $SPN_1$. An alternative method for routing the call to $SPN_1$ is for the caller to call the home location phone number assigned to the called party and the resulting call is then redirected to $SPN_1$. In accordance with step 1310, $SPN_1$ sends an SMS message to the roaming phone, the message including information concerning caller identification, $SPN_1$ location information (Point Code in an SS7 context), a call ID assigned by $SPN_1$ to the call, and a command for the roaming phone to initiate a call the nearest or servicing SPN (defined as $SPN_2$ for purposes of this description). In accordance with step 1320, the SMS message reaches the roaming phone via the wireless cellular network through the home MSC and the MSC servicing the roaming phone. In accordance with step 1330, the roaming phone SIM initiates call to the $SPN_2$ and furnishes $SPN_1$ location information and the call ID. The number associated with $SPN_2$ is determined and stored within the roaming phone through the information sent to it by the CPADC during initial registration of the roaming phone. In accordance with step 1340, $SPN_2$ places its call connection with the roaming phone on hold, and initiates a call connection between $SPN_2$ and $SPN_1$, utilizing the SPN location information (Point Code) earlier obtained and informing $SPN_1$ that the call connection between $SPN_1$ and $SPN_2$ is associated with the call connection from the caller held at $SPN_1$ having the corresponding call ID number. In accordance with step 1350, $SPN_1$ uses the call ID to identify the call connection from the caller held at $SPN_1$ and bridges that call connection with the call connection between $SPN_1$ and $SPN_2$, thus establishing a call connection between the calling party and the roaming phone. In Step 1360, the call record and call details associated with a successfully placed call are monitored by the SPN call processor, in real-time, and the prepaid account balance is therefore updated (typically decremented) in real-time according to usage. If the prepaid account balance is exhausted, or an established threshold quantity is exceeded, the call connection may be terminated.

Figure 14:
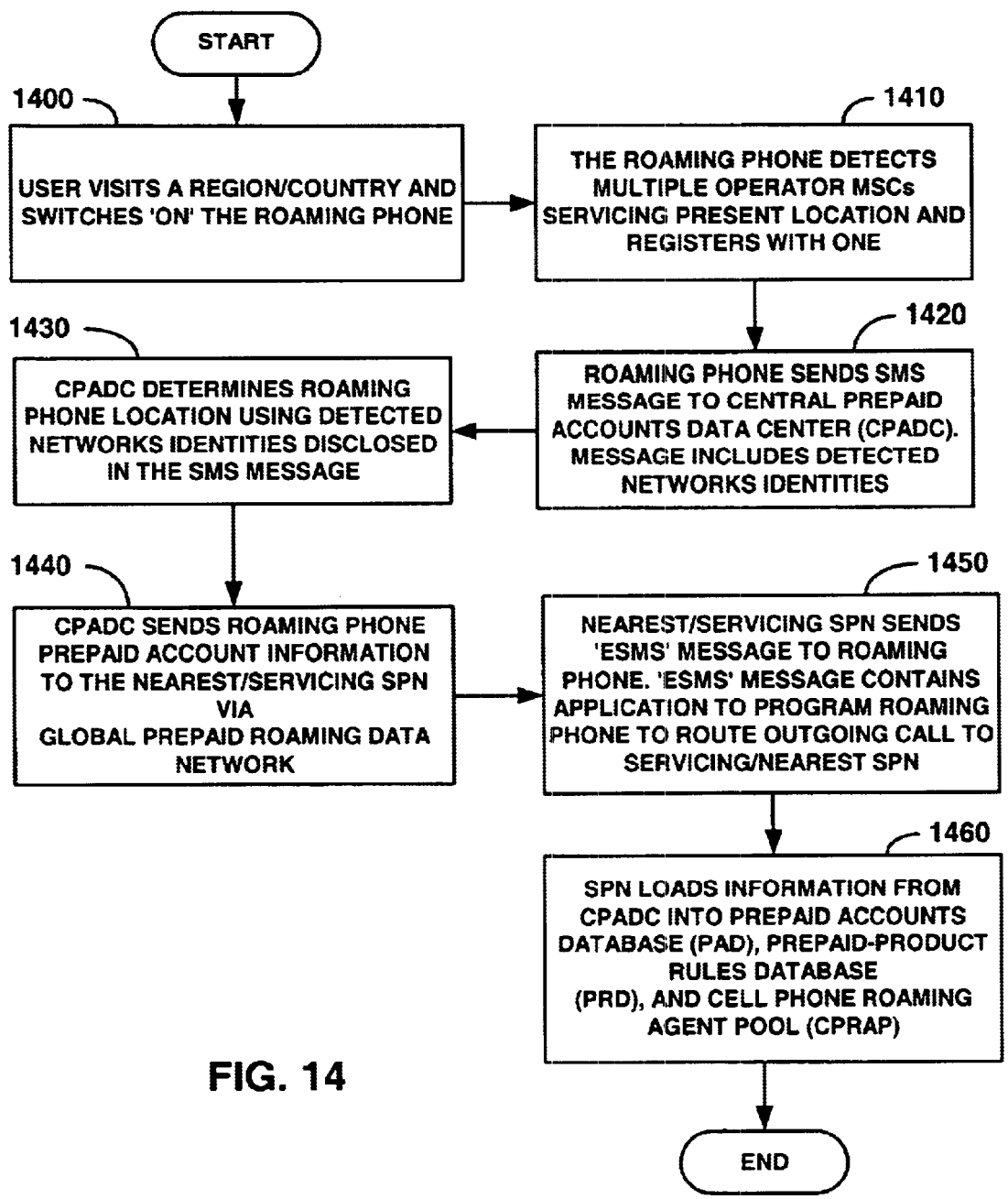
FIG. 14 is a flow chart illustrating yet another exemplary method for roaming mobile phone detection and registration, in accordance with the principles embodied in the present invention.

FIG. 14 is a flow chart illustrating yet another exemplary method for roaming mobile phone detection and registration, in accordance with the principles embodied in the present invention. In accordance with step 1400, a mobile phone user enters a country in which he must roam and switches on his cellular phone. In accordance with step 1410, the phone automatically detects wireless transmissions from multiple MSC operators servicing the region/ location and responds by sending its cellular phone identification information to one of the MSCs detected. The MSC receives the cellular phone identification information and thus detects the cellular phone and classifies'the phone as a roaming phone, since the phone is not included in its HLR database. In accordance with step 1420, the roaming phone sends an SMS message to the CPADC. The SMS message includes the network identities for the multiple MSCs it detected during step 1410 and information specific to the roaming phone itself. Alternatively or additionally, the SMS message may also contain information such as location data of the MSCs and/or time-of-day. In accordance with step 1430, the CPADC determines the roaming phone location by table look-up (or other appropriate means) using the detected network identities and other information supplied by the roaming phone. In accordance with step 1440, the CPADC sends roaming phone prepaid account information to the nearest/servicing SPN via the global prepaid roaming data network (or other non-proprietary network). In accordance with step 1450, the servicing SPN launches an Executable Short Message Service (ESMS) message (or equivalent message) with application program content to the roaming cellular phone. The ESMS (or equivalent message) is used to configure the roaming cellular phone so that it will first contact the nearest SPN (or servicing SPN) when making an outgoing call (instead of having the MSC connecting the call directly to the called party). In accordance with step 1460, the SPN loads the information received from the CPADC corresponding to the roaming cellular phone into the prepaid accounts database (PAD), prepaid product rules database (PRD) and cell phone roaming agent pool (CPRAP) database, completing the roaming cellular phone registration process for roaming in the visited region or country.

Each of the embodiments previously described represent varying methodologies for completing outgoing and incoming calls to a roaming phone. Each method for completing a call has associated with it certain call charges and overhead. That is, one methodology may be more cost efficient between a given set of locations, but another methodology may be more cost efficient between a different set of locations. One novel aspect of the present invention is the ability to dynamically select between various call connection methodologies based upon such parameters as caller location, called party location, and calling time, etc. Selection of a particular methodology over others is made utilizing rule-bases designed to optimize parameters such as call cost and/or user convenience, although other selection criteria may also be utilized.

The previous description merely illustrates the principles of the invention. It will thus be appreciated that those skilled in the art will be able to devise various arrangements which, although not explicitly described or shown herein, embody the principles of the invention and are included within its spirit and scope. For example, in the description of the various embodiments of the present invention, it is assumed that the routing of information messages to and from SPNs are carried utilizing a network such as the Signaling System 7 (SS7) network. Furthermore, routing and other information exchange has been described in the context of use of Short Message Service (SMS) messages. However, it would be apparent to those skilled in the art that various other means and networks may also be used. Therefore, use of various networks/protocols/technologies, such as the Internet, Cellular Digital Packet Data (CDPD), or General Packet Radio Service (GPRS), Transmission Control Protocol/Internet Protocol (TCP/IP), or Wireless Application Protocol (WAP), for communication between SPNs is fully contemplated and are included within the scope of the present invention.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method for providing global pre paid roaming services for a user of a roaming phone, said method comprising the steps of:
   calling, from said roaming phone located in a first region, a destination party in a second region;
   establishing a first call connection, responsive to said calling step, between said roaming phone and a service processing node (SPN) in said first region;
   establishing a second call connection, responsive to said step of establishing said first call connection, between said SPN in said first region to said destination party in said second region; and
   bridging said first call connection with said second call connection to establish a call between said roaming phone and said destination party in said second region.

2. The method in accordance with claim 1 further comprising the step of:
   monitoring real-time prepaid account call detail data associated with usage of said roaming phone at said SPN and providing said global prepaid roaming services for said roaming phone only if an available account balance associated with said roaming phone is greater than a threshold value.

3. The method in accordance with claim 1 wherein said step of bridging said first call connection with said second call connection is contingent upon a determination made by said SPN that a subscriber rules basis associated with said roaming phone is met.

4. The method in accordance with claim 1 wherein continued bridging of said first call connection with said second call connection is contingent upon a determination made by said SPN that a real-time subscriber rules basis associated with said roaming phone is maintained.

5. A method for connecting a call from a originating first region to a wireless phone roaming in a second region, said method utilizing prepaid account services and comprising the steps of:
   signaling from said first region to a home region associated with said wireless phone to determine that said wireless phone is roaming in said second region;
   signaling a cellular-switching center (CSC) in said second region, responsive to said determination that said wireless phone is roaming in said second region, to inform said cellular-switching center in said second region of a call connection request to said wireless phone;
   routing said call, responsive to said call connection request, from said CSC in said second region to a service processing node (SPN) in said second region and establishing a first call connection from said originating first region to said SPN in said second region;
   launching a Short Message Service (SMS) message from said SPN in said second region to said wireless phone, said SMS message instructing said wireless phone to establish a second call connection with said SPN in said second region; and
   bridging said first call connection with said second call connection, responsive to establishing said second call connection with said SPN.

6. The method in accordance with claim 5 further comprising the step of:
   monitoring real-time prepaid account call detail data associated with usage of said wireless phone at said SPN and providing services for said wireless phone only if an available account balance associated with said wireless phone is greater than a threshold value.

7. The method in accordance with claim 5 wherein said step of bridging said first call connection with said second call connection is contingent upon a determination made by said SPN that a subscriber rules basis associated with said wireless phone is met.

8. The method in accordance with claim 5 wherein continued bridging of said first call connection with said second call connection is contingent upon a determination made by said SPN that a real-time subscriber rules basis associated with said wireless phone is maintained.

9. A method for registration of a wireless phone roaming in a first region, said method for use with global prepaid services and comprising the steps of:
   registering a phone identification for said wireless phone with a first region mobile switching center (MSC) upon power-up and detection of said wireless phone in said first region;

launching an executable short message service (ESMS) message, responsive to said registering step, to said wireless phone to program said wireless phone to route an outgoing call made from said wireless phone to a service processing node (SPN) nearest said wireless phone;

conveying account and location information associated with said wireless phone from a home MSC associated with said wireless phone to a central prepaid accounts data center (CPADC);

forwarding said account and location information associated with said wireless phone from said CPADC to said SPN nearest said wireless phone; and storing said account and location information associated with said wireless phone within a prepaid accounts data and rules database at said SPN nearest said wireless phone.

10. The method in accordance with claim 9 wherein said wireless phone includes a subscriber identification module (SIM) card for data storage and program execution associated with data and executables received via said ESMS message.

11. A method for providing global phone services, said method comprising the steps of:

calling, from a phone located in a first region, a destination party in a second region;

establishing a first call connection, responsive to said calling step, between said phone and a service processing node (SPN) in said first region; and establishing a second call connection, responsive to said step of establishing a first call connection, between said SPN in said first region to said destination party in said second region.

12. The method in accordance with claim 11 further comprising the step of:

bridging said first call connection with said second call connection to establish a call between said phone and said destination party in said second region.

13. The method in accordance with claim 11 wherein said SPN provides optimized enhanced services for a user of said phone.

14. The method in accordance with claim 13 wherein said phone is a wireless phone.

15. The method in accordance with claim 11 wherein said SPN provides optimized enhanced services for a user of said phone.

16. The method in accordance with claim 11 wherein said optimized enhanced services are enabled through the use of a dynamically controlled protocol selection.

17. The method in accordance with claim 11 further comprising the step of:

routing information messages to and from said SPN utilizing a network other than the Signaling System 7 (SS7) network.

18. The method in accordance with claim 17 wherein said network utilizes Short Message Service (SMS).

19. The method in accordance with claim 17 wherein said network utilizes Wireless Application Protocol (WAP).

20. The method in accordance with claim 17 wherein said network is the Internet.

21. A method for registration of a wireless phone roaming in a first region, said method for use with global prepaid services and comprising the steps of:

registering a phone identification for said wireless phone with a first region mobile switching center (MSC) upon power-up and detection of said wireless phone in said first region;

determining, by said wireless phone, a wireless phone global location by analyzing data contained in a received transmission from said MSC;

launching a message containing wireless phone global location and wireless phone identity information, from said wireless phone to a central prepaid accounts data center (CPADC);

launching a message including said wireless phone identity and account information associated with said wireless phone from said CPADC to a service processing node (SPN) servicing said wireless phone;

storing said account information associated with said wireless phone within a prepaid accounts data and rules database at said SPN servicing said wireless phone; and launching an executable short message service (ESMS) message from said SPN, to said wireless phone to program said wireless phone to route an outgoing call made from said wireless phone to said SPN servicing said wireless phone.

22. A method for connecting a call initiated from a caller in a first region to a wireless phone roaming in a second region, said method comprising the steps of:

establishing a first call connection between said caller and a first service processing node (SPN), said first SPN servicing said first region;

establishing, between a second SPN and said wireless phone, a second call connection;

establishing, between said second SPN and said first $SPN_1$ a third call connection;

bridging said second call connection with said third call connection to create a fourth call connection, said fourth call connection between said wireless phone and said first SPN; and bridging said fourth call connection with said first call connection to complete said call between said caller and said wireless phone.

23. A method for registration of a wireless phone roaming in a first region, said method for use with global prepaid services and comprising the steps of:

registering a phone identification for said wireless phone with a first region mobile switching center (MSC) upon power-up and detection of said wireless phone in said first region;

determining, by said wireless phone, a wireless phone global location using data inputted by a user of said wireless roaming phone;

launching a message containing wireless phone global location and wireless phone identity information, from said wireless phone to a central prepaid accounts data center (CPADC);

launching a message including said wireless phone identity and account information associated with said wireless phone from said CPADC to a service processing node (SPN) servicing said wireless phone;

storing said account information associated with said wireless phone within a prepaid accounts data and rules database at said SPN servicing said wireless phone; and launching an executable short message service (ESMS) message from said SPN, to said wireless phone to program said wireless phone to route an outgoing call made from said wireless phone to said SPN servicing said wireless phone.

\* \* \* \* \*